United States Patent
Miller et al.

(10) Patent No.: US 7,467,033 B2
(45) Date of Patent: Dec. 16, 2008

(54) CONTROL METHOD FOR A VEHICLE POWERTRAIN WITH PROTECTION AGAINST LOW LOAD CONDITIONS

(75) Inventors: Kenneth Miller, Canton, MI (US); Paul Gartner, Dearborn, MI (US); Carol Okubo, Belleville, MI (US); Douglas Martin, Canton, MI (US); Edward Badillo, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 776 days.

(21) Appl. No.: 10/906,784

(22) Filed: Mar. 7, 2005

(65) Prior Publication Data

US 2006/0199695 A1 Sep. 7, 2006

(51) Int. Cl.
*B60L 9/00* (2006.01)
(52) U.S. Cl. .................. 701/22; 701/84; 701/101; 477/2
(58) Field of Classification Search ............ 701/1, 701/22, 84, 101; 180/408, 446; 477/2, 34
See application file for complete search history.

(56) References Cited

U.S. PATENT DOCUMENTS

| | | | |
|---|---|---|---|
| 4,021,677 A | 5/1977 | Rosen et al. | |
| 5,408,974 A | 4/1995 | Lipinski et al. | |
| 6,065,446 A | 5/2000 | Engl et al. | |
| 6,090,007 A | 7/2000 | Nakajima et al. | |
| 6,178,371 B1 | 1/2001 | Light et al. | |
| 6,373,144 B2 * | 4/2002 | Frohlich et al. | 290/40 R |
| 6,431,130 B1 | 8/2002 | Leone et al. | |
| 6,513,493 B1 | 2/2003 | Robichaux et al. | |
| 6,553,287 B1 | 4/2003 | Supina et al. | |
| 6,718,255 B1 | 4/2004 | Okubo | |
| 6,754,578 B1 | 6/2004 | Bidner et al. | |
| 7,225,518 B2 * | 6/2007 | Eidenschink et al. | 29/283.5 |

* cited by examiner

*Primary Examiner*—Gertrude Arthur Jeangla
(74) *Attorney, Agent, or Firm*—David B. Kelley; Brooks Kushman P.C.

(57) ABSTRACT

A control method is disclosed for maintaining a calibrated minimum load for an engine in a vehicle powertrain with an engine. The possibility of engine misfire due to low engine loads is reduced. Further, undesired high temperature of an engine exhaust gas catalytic converter due to prolonged operation of the powertrain at low engine loads is avoided.

26 Claims, 4 Drawing Sheets

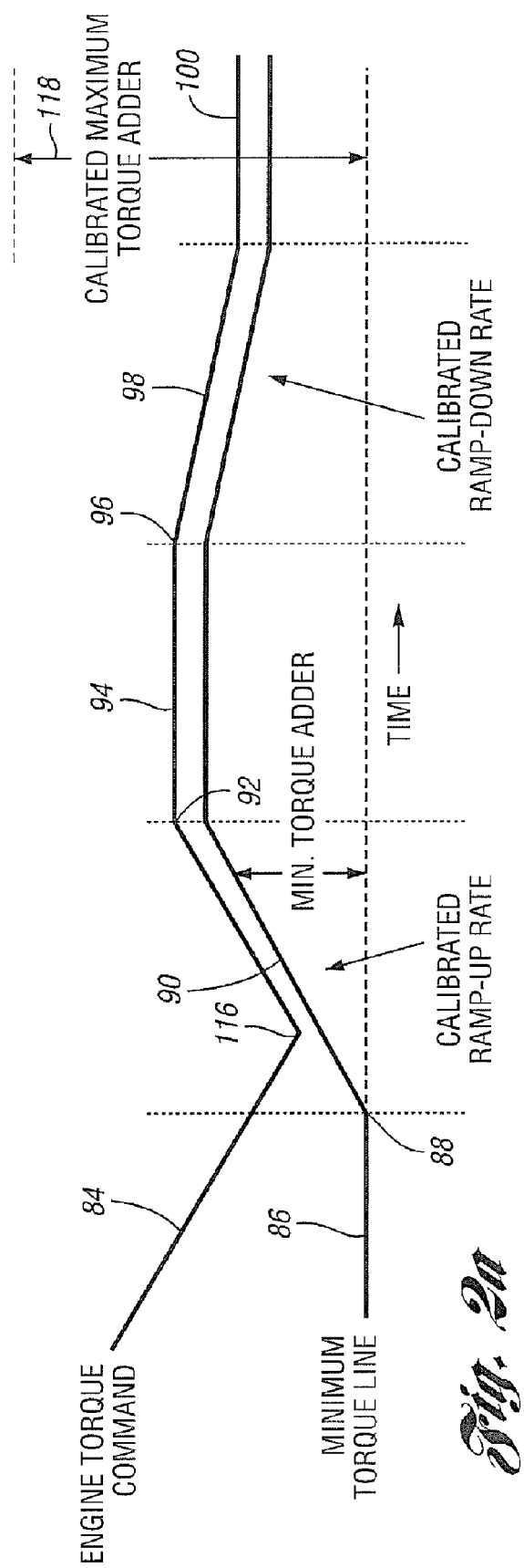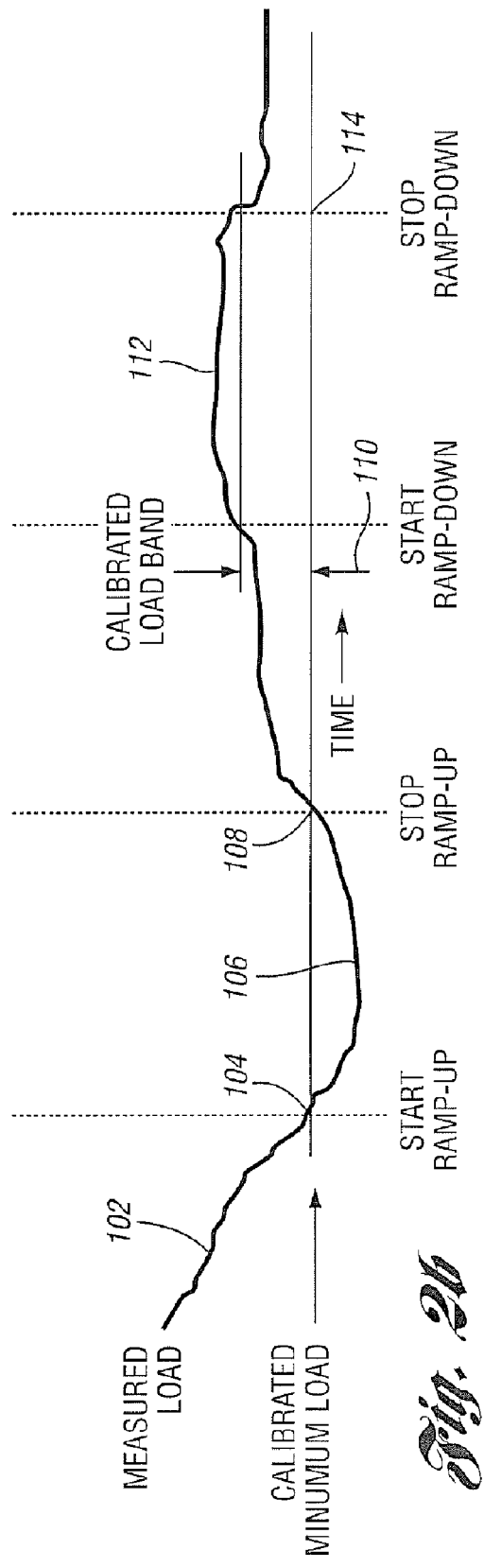
Fig. 2a
Fig. 2b

CONTROL METHOD FOR A VEHICLE POWERTRAIN WITH PROTECTION AGAINST LOW LOAD CONDITIONS

BACKGROUND OF THE INVENTION

1. Field of the Invention

The invention comprises a control for a vehicle powertrain having an internal combustion engine wherein minimum engine load is tightly controlled.

2. Background Art

Parallel-series hybrid electric vehicle powertrains capable of embodying the present invention are disclosed in U.S. patent application Ser. No. 10/709,537, filed May 12, 2004, now U.S. Pat. No. 7,013,213, and U.S. patent application Ser. No. 10/905,324, filed Dec. 28, 2004, now U.S. Pat. No. 7,223,201. Each of these patent applications is assigned to the assignee of the present invention.

Parallel-series hybrid electric vehicle powertrains provide power flow paths to vehicle traction wheels through gearing. In one operating mode, a combination of an internal combustion engine and an electric motor-generator subsystem may define in part separate torque delivery paths. The motor-generator subsystem includes a battery, which acts as an energy storing medium. In a first forward driving mode, the engine propels the vehicle using reaction torque of a generator, which is a part of the motor-generator subsystem. Planetary gearing makes it possible for the engine speed to be controlled independently of vehicle speed using generator speed control. In this configuration, engine power is divided between a mechanical power flow path and an electrical power flow path. Electrical power is distributed from the engine to the generator through transmission gearing. The generator is electrically coupled to an electric motor of the motor-generator subsystem, which in turn drives the vehicle traction wheels. Because the engine speed is decoupled from the vehicle speed, the powertrain emulates the characteristics of a continuously variable transmission during a driving mode in which the engine is active.

The electric motor provides a braking torque to capture vehicle kinetic energy during braking, thus charging the battery as the motor acts as a generator. Further, the generator, using battery power, can drive against a one-way clutch on the engine power output shaft to propel a vehicle in a forward drive mode as the generator acts as a motor.

As in the case of conventional continuously variable transmissions in vehicle powertrains, it is possible to achieve better fuel economy and exhaust gas emission quality by operating the engine at or near the most efficient operating region of its engine speed and torque relationship. The engine can be stopped if the engine operating conditions are not favorable for high fuel efficiency operation or if the engine is not in a high emission quality control region. In this way, the two power sources (i.e., the engine and the motor-generator subsystem) can be integrated and coordinated to work together seamlessly to achieve the goal of better fuel economy and emissions control.

A vehicle system controller performs the coordination of the control of the two power sources. Under normal powertrain operating conditions, the vehicle system controller interprets a driver demand for acceleration or deceleration and then determines when and how much torque each power source needs to provide in order to meet the driver's demand and achieve specified vehicle performance. Specifically, the vehicle system controller determines the speed and torque operating point for the engine.

In a hybrid powertrain of this kind, there are many operating conditions that require the engine to be operated near its minimum load or minimum torque limit. If the engine has an electronic throttle control, as distinct from a mechanically controlled throttle valve, the engine throttle element is controlled by a torque-based algorithm, which can result in a variation in the minimum engine load from a pre-calibrated value. If the minimum engine load is not tightly controlled, it is possible that a misfire condition will occur if the load is too low. Further, the hybrid powertrain battery might be overcharged if the minimum engine load is not tightly controlled and if the engine load is too high.

SUMMARY OF THE INVENTION

The invention comprises a method and strategy for use with a vehicle powertrain wherein added protection is provided against low engine load operating conditions. The invention includes a logic for monitoring a measured load calculated from a mass air flow sensor signal and adjusting the minimum allowable torque limit if a measured load falls below a pre-calibrated minimum load value. The logic has a limit on the allowable range of the torque adjustment to prevent over-correction due, for example, to a potentially excessive mass air flow sensor error.

The invention can be applied to a hybrid electric vehicle powertrain that includes an engine, at least one electric motor-generator, a battery and gearing that establish power flow paths from the engine and the motor-generator to a driven member, such as a power delivery shaft for vehicle traction wheels. A vehicle system controller coordinates power distribution from the engine and the motor-generator in accordance with operating variables, including a driver demand for power and battery state of charge.

Although a hybrid electric vehicle powertrain is disclosed herein, the invention may be applied as well to non-hybrid vehicle powertrains that include an internal combustion engine.

The method of the invention comprises calibrating a minimum engine load below which operation of the engine would be unstable. An engine torque command is issued by the vehicle system controller and an engine load corresponding to the torque command is measured. The engine torque command at a given engine speed is compared to a minimum torque value that corresponds to a calibrated minimum engine load.

A minimum engine torque adder, which is calibrated as a torque ramp rate, is used to adjust the allowable torque limit when it is added to the engine torque if the measured engine load is near a calibrated minimum engine load for a given engine speed. As a result of controlling the engine in this fashion, engine fuel combustion stability is maintained and undesirable engine exhaust gas temperature is avoided during prolonged engine operation at low load.

According to one aspect of the invention, the minimum torque adder is used to ramp up the engine torque command using a ramp and hold technique when the engine torque command approaches a calibrated minimum engine torque value. Similarly, the engine torque command is ramped down when a filtered engine load is higher than a calibrated minimum load band.

According to another aspect of the invention, the ramping of the engine torque command can be achieved using a proportional-integral control technique. Furthermore, the variations in engine torque command with respect to time need not necessarily be straight-line variations as shown in the accompanying drawings.

BRIEF DESCRIPTION OF THE DRAWINGS

FIG. 2a is a time plot of an engine torque command and a minimum torque line, the latter being calibrated for a particular engine used in a hybrid electric vehicle powertrain;

FIG. 2b is a time plot of the measured load for an engine in a hybrid electric vehicle powertrain and a comparison of the measured load with the calibrated minimum load;

FIG. 3 is a logic flow diagram for calculating a minimum load adder to modify the engine torque command shown in FIG. 2a;

DETAILED DESCRIPTION OF EMBODIMENTS OF THE INVENTION

Figure 1:
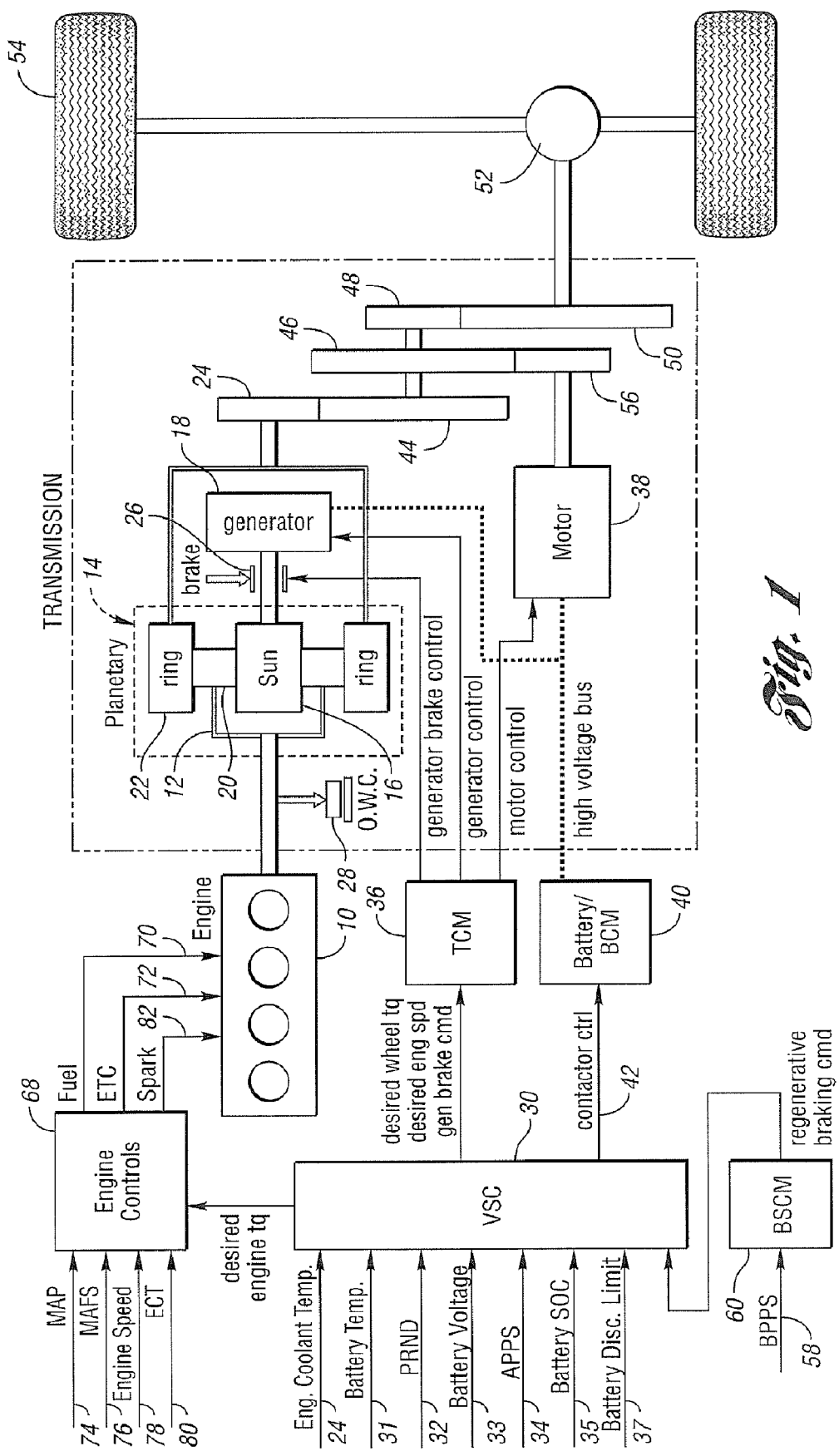
FIG. 1 is a schematic representation of the overall powertrain system, which is capable of being controlled using the control method and strategy of the invention.

In the hybrid powertrain configuration schematically illustrated in FIG. 1, a torque output crankshaft of internal combustion engine 10 is connected drivably to carrier 12 of planetary gear unit 14. Sun gear 16 of the gear unit 14, which acts as a reaction element, is drivably connected to generator 18. Carrier 12 rotatably supports planet pinions 20, which engage sun gear 16 and ring gear 22, the latter being connected drivably to transmission torque input gear 24. The generator 18 provides reaction torque when the engine delivers driving power to the transmission. The generator, which is part of a motor-generator-battery electrical subsystem, develops electrical power to complement mechanical engine power. A reaction brake 26 can be applied to establish a reaction point for the sun gear 16 and to deactivate the generator 18.

When the generator acts as a motor and the engine is deactivated, the crankshaft for the engine is braked by an overrunning coupling 28. Overrunning coupling 28 could be eliminated if sufficient reaction torque can be accommodated by the engine crankshaft when the engine is shut off.

The main controller for the powertrain is a vehicle system controller, generally shown at 30 in FIG. 1. It receives a driver-selected signal at 32 indicating whether the transmission is conditioned for park, reverse, neutral or drive mode. A battery temperature signal is distributed to controller 30 as shown at 31. An accelerator pedal position sensor delivers a signal at 34 to the vehicle system controller 30. This is an indicator of driver power demand. The controller 30 also receives an engine coolant temperature signal 29, a battery voltage signal 33, a battery state of charge signal 35, and a battery discharge limit signal 37.

The desired wheel torque command, the desired engine speed command and the generator brake command are developed by the vehicle system controller and distributed to the transmission control module 36 for controlling the transmission generator brake, the generator control and the motor control. Electric power is distributed to an electric motor 38, which may be a high torque induction motor, although other electric motors could be used instead in carrying out the control functions of the invention.

The electrical power subsystem, of which the generator 18 and the motor 38 are a part, includes also battery and battery control module 40, which is under the control of the vehicle system controller 30, the latter developing a command at 42 for a battery control module contractor, which conditions the battery for charging or for power delivery. The battery, the motor and the generator are electrically connected by a high voltage bus as indicated.

The transmission includes countershaft gearing having gear elements 44, 46 and 48. Gear element 48 is connected to torque output gear 50, which delivers power to differential 52 and to traction wheels 54. The motor armature is connected to motor drive gear 56, which drivably engages gear element 46.

Application of the vehicle brakes develops a brake pedal position sensor signal 58, which is delivered to the brake system control module 60 for initiating a regenerative braking command by the vehicle system controller.

A hybrid vehicle powertrain, such as that illustrated in FIG. 1, makes use of a combination of the engine and generator using the planetary gear unit 14 to connect them to each other. In one driving mode, the electric drive system, including the motor, the generator and the battery, can be used independently of the engine. The battery then acts as an energy storing unit. When the engine is operative, the vehicle is propelled in a forward direction as reaction torque for the planetary gear unit is accommodated by the generator or by the reaction brake 26.

The planetary gear unit 14 effectively decouples the engine speed from the vehicle speed using a generator command from module 36. Engine power output then is divided into two power flow paths, one being a mechanical path from the carrier 12 to the ring gear 22 and finally to the transmission input gear 24. Simultaneously, an electrical power flow path is established from the carrier 12 to the sun gear 16 to the generator, which is coupled electrically to the motor. Motor torque drives output gear 56. This speed decoupling and the combined electrical and mechanical power flow paths make this transmission function with characteristics similar to a conventional continuously variable transmission.

When the electrical power flow path is effective with the engine inactive, the electric motor draws power from the battery and provides propulsion independently of the engine in both forward and reverse directions. Further, the electric motor can provide braking torque as the motor acts as a generator. This captures the vehicle kinetic energy during braking, which otherwise would be lost to heat, thereby charging the battery. The generator, furthermore, using battery power, can drive against one-way clutch 28 (or a reaction torque developed by the engine crankshaft) to propel the vehicle in a forward direction as the generator acts as a motor. Both the engine and the motor-generator-battery subsystem, as mentioned previously, can be used simultaneously to propel the vehicle in a forward direction to meet the driver's power demand and to achieve better acceleration performance.

As in the case of conventional continuously variable transmission vehicles, fuel economy and emission quality are improved by operating the engine in or near its most efficient region whenever possible. As previously explained, fuel economy potentially can be improved, as well as the emission quality, because the engine size can be reduced while maintaining the same vehicle performance due to the fact that there are two power sources. The engine can be stopped (turned off) and the motor can be used as the sole power source if the required engine operating conditions for the engine are not favorable for fuel economy and emissions quality purposes.

The engine 10 includes an engine controller 68, which controls engine fuel injectors, which respond to engine control parameters for delivering measured quantities of fuel to the engine cylinders. The control of air to the engine cylinders, as illustrated at 70, is effected by an electronic throttle control, as indicated at 72.

The engine controls respond to input variables, including manifold absolute pressure, as shown at 74, a mass air flow sensor signal, as shown at 76, an engine speed signal, as shown at 78, and an engine coolant temperature signal, as shown at 80.

In addition to electronic throttle control signals and fuel delivery signals developed by the engine control 68, a spark timing signal also is developed as shown at 82.

Assuming there are no subsystem component malfunctions, the vehicle system controller interprets driver demands, such as the drive range selection at 32 and acceleration or deceleration demand at 34, and then determines a wheel torque command based on the driver demand and the powertrain limits. In addition, the vehicle system controller determines how much torque each power source needs to provide, and when it needs it, in order to meet driver demand and to achieve a specified vehicle performance, a desired fuel economy and a desired emission quality level. The vehicle system controller thus determines when the engine needs to be turned off and on. It also determines the engine operating point (i.e., the engine speed and torque) for a given engine power demand when the engine is on.

In FIG. 2a, the engine torque command issued by the driver is shown by the plot at 84. The calibrated minimum torque value is shown at 86 in FIG. 2a. The engine torque command is illustrated in FIG. 2a as a progressively decreasing variable.

In FIG. 2a, the engine torque command progressively decreases, as shown at 84, until it approaches a minimum torque line shown at 86. The strategy will not allow the engine torque command to decrease to a value at or near the minimum torque line. At point 88 in FIG. 2a, the minimum allowed torque line begins to ramp up, as shown at 90, because the measured load has decreased below the calibrated minimum load at 106. The ramping is accomplished by calculating a minimum torque adder, which increases from the time at point 88 to the time at point 92.

When the measured load exceeds the calibrated load at 108, the engine torque command at point 92 is held steady at a value indicated at 94. That value includes the value of the minimum torque adder. If the measured load exceeds a hysteresis value, the engine torque command is ramped down at time value 96 at a reduced rate compared to the rate of increase between time values 88 and 92. This is shown at 98. Finally, the engine torque command becomes settled at a relatively constant value, as shown at 100.

The load that corresponds to the torque command plot of FIG. 2a is shown in FIG. 2b. The measured load decreases, as shown at 102, as the engine torque command deceases, as shown at 84. When the calibrated minimum load is reached at 104, the filtered measured load drops below a calibrated minimum load, as shown at 106. The minimum load curve then reverses direction in response to the ramping of the engine torque command as the minimum torque adder is applied, as shown at 90. When the calibrated minimum load is reached at time value 108, the minimum load is within a calibrated load band, as shown at 110 in FIG. 2b. The ramping down of the engine torque command at 98 is the result of an increase in the measured load above the calibrated minimum load band 110, as shown at 112. At time value 114, the measured load again enters the calibrated minimum load band and the engine torque command continues at its constant value, as shown in 100 in FIG. 2a.

The time lapse between point 104 and point 108 may be very short (e.g., .5 seconds).

The up-ramp at 90 and the down-ramp at 98 in FIG. 2a can be accomplished using a well known ramp and hold technique. Ramping, however, need not necessarily be a straight-line time function. In an alternate embodiment of the invention, ramping can be done also, for example, using a proportional-integral computation technique.

The logic represented by FIGS. 2a and 2b is a protective logic for modifying the normal minimum torque logic. Worst case conditions are used during calibration to force or trigger this logic. Initially, calibration values for the engine torque command temporarily modify the input data to create these worst case conditions.

The minimum torque command is forced in a downward direction, as shown at 84. As explained, this results in a decrease in the measured load, as shown at 102. The minimum load logic is triggered by setting the minimum torque line at a value of about 15 Newton meters (Nm) lower than the nominal calibration value. If the minimum load line does not drop low enough during calibration to trigger the logic, the vehicle system controller should be checked to verify that it is commanding a torque near the minimum. One way to force the engine torque command downward toward the minimum is to charge the battery to a charge level (SOC) near a highly charged value. The vehicle system controller then will try to discharge the battery by commanding a lower engine torque. Another way to drive the load lower during calibration is to ensure that the air conditioning system is off. When the air conditioning system is off, the engine runs at a lower load to deliver a given net torque. A lowering of the minimum torque line, however, increases a risk of engine misfire, which could cause engine exhaust gas catalyst temperature to rise.

When the engine operator commands a tip-out by retracting the accelerator pedal quickly, the torque command drops at a maximum rate. A quickly decreasing torque command is a worse case condition because it takes some time for the system to respond, which may cause an under-shoot in load, as indicated at 106 in FIG. 2b. The system response is affected by two factors. First, it may take some time for the ramp rate, shown at 90, to increase the minimum torque limit to a point where it affects engine torque command. This is seen at point 116 in FIG. 2a. Second, once the torque command begins to rise, it takes time for the intake manifold pressure to respond before load recovers to the calibrated minimum load indicated at 108 in FIG. 2b. Therefore, to test the worst case condition, the torque command is commanded to drop at a maximum rate.

The calibration of the minimum load parameters preferably is done with a warmed up engine with full throttle tip-outs at 60 miles per hour. The minimum load parameters are calibrated so that the load is high enough to prevent excessive catalyst temperature rise in the catalytic converter for the engine, but low enough to prevent undesired battery charging as the torque settles into an idle condition, as shown at 100 in FIG. 2a.

The desired minimum load torque should be set at or below the minimum load values at a misfire limit determined during calibration. The calibrated load band 110 should be kept as small as possible to prevent a high minimum load that could cause undesired battery charging. It should not be so small, however, as to cause excessive cycling between the up ramp and the down ramp for the engine torque command.

The up ramp should be calibrated so that it is large enough to provide for a quick recovery in load, as shown at 106 in FIG. 2*b*. The load then will not continue to drop excessively below the minimum load line, as shown in FIG. 2*b*. The torque up ramp calibration at 90 should be small enough, however, to prevent excessive over-shoot, as shown at 112.

The down ramp shown at 98 should be calibrated so that it is much slower than the up ramp rate. This allows for a slow control of reduction in load, as shown at 112 in FIG. 2*b*.

The minimum torque adder shown in FIG. 2*a* should be calibrated so that it is small enough to prevent excessive correction in the event that the air mass meter reading is too low. The upper limit for the calibrated minimum torque adder is shown in FIG. 2*a* at 118.

Figure 3:
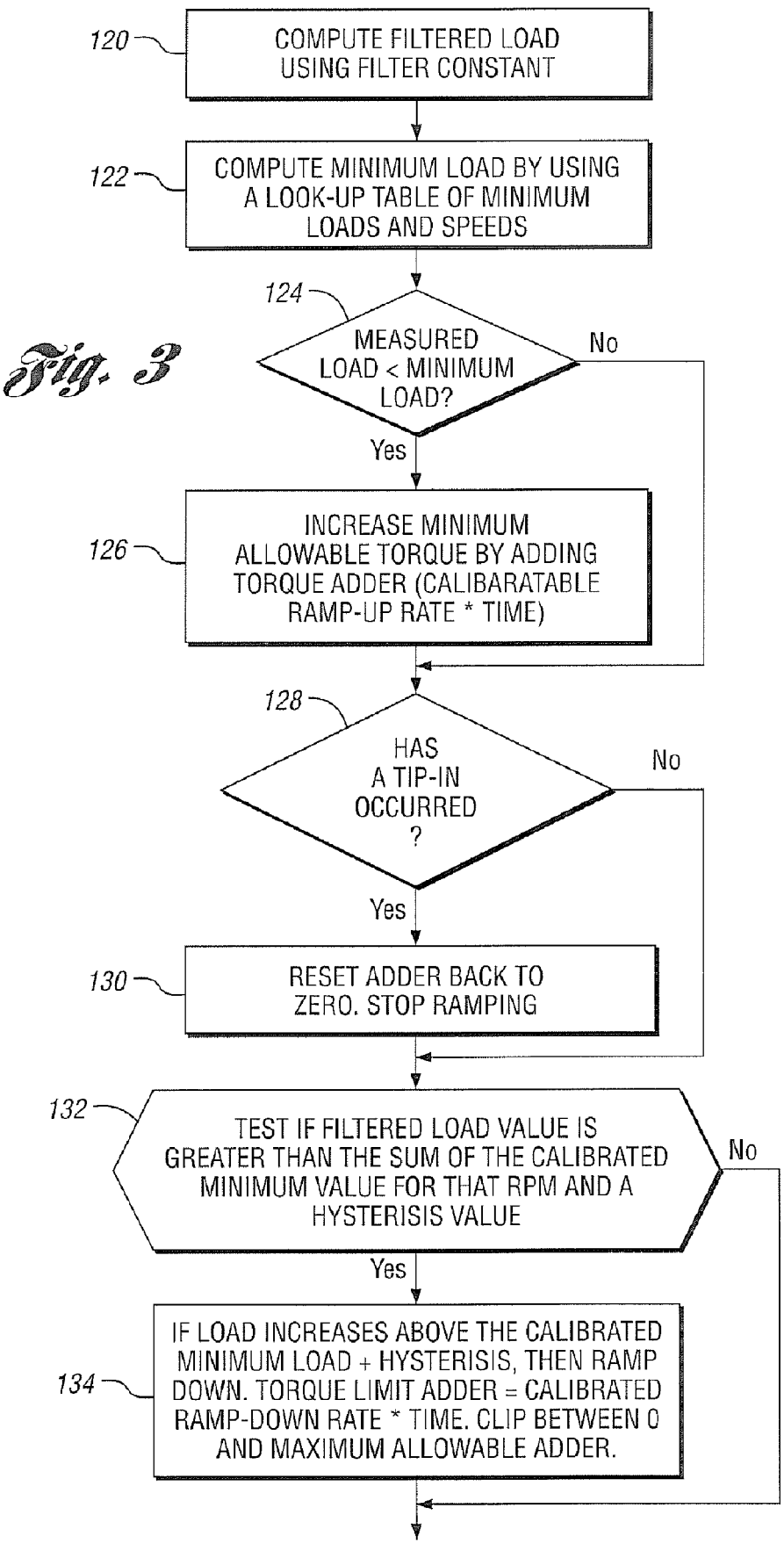

The logic diagram of FIG. 3 shows the calibration technique. At step 120, a filtered measured load value using a calibrated filter constant is computed. Using a look-up table, the minimum engine torque line is computed using engine speed as a variable. This is done at action block 122 in FIG. 3.

At decision block 124 in FIG. 3, it is determined whether the measured load drops below the calibrated minimum load threshold. If that inquiry is positive, then the minimum allowable torque is ramped up at action block 126. This is done by adding a torque limit adder value, which is equal to a calibratable ramp up rate multiplied by time. The minimum torque adder is clipped to a calibrated value between time point 92 and time point 96 in FIG. 2*a*.

If the measured load does not drop below a calibrated minimum load threshold as indicated at decision block 124, the routine will proceed directly to decision block 128, where it is determined if a tip-in has occurred. If this condition exists, the adder is cleared and reset to zero. This occurs at action block 130. If the load increases above the calibrated minimum load, then ramping is stopped.

The routine then proceeds to decision block 132 where it is determined if the load increases above the calibrated minimum load value plus a hysteresis value. If the load has increased above the sum of those values, the load line is ramped down. The calibrated ramp down rate is illustrated in FIG. 2*a* and FIG. 2*b*. A ramp down torque limit adder is equal to the calibratable ramp down rate multiplied by time. This occurs at action block 134.

By using a minimum torque adder, as explained with reference to FIGS. 2*a* and 2*b*, stable engine combustion is achieved. This reduces engine emissions. It also will reduce the possibility of thermal damage to the catalytic converter. In order to maintain stable combustion for the engine at very low engine loads, a minimum air flow must be maintained for the engine. Combustion with air flow lower than this minimum could result in engine misfire, which leads to higher emissions and undesirable high catalytic converter temperatures. In the torque-based strategy described with reference to FIGS. 2*a* and 2*b*, where air flow is calculated based on requested engine torque, this minimum misfire air flow can be translated to a minimum indicated engine torque at a given engine operating speed. Prolonged operation at or very near this minimum torque limit could result in higher emissions of undesirable hydrocarbons and possible damage to the catalytic converter resulting from the high exhaust gas temperatures.

Figure 4:
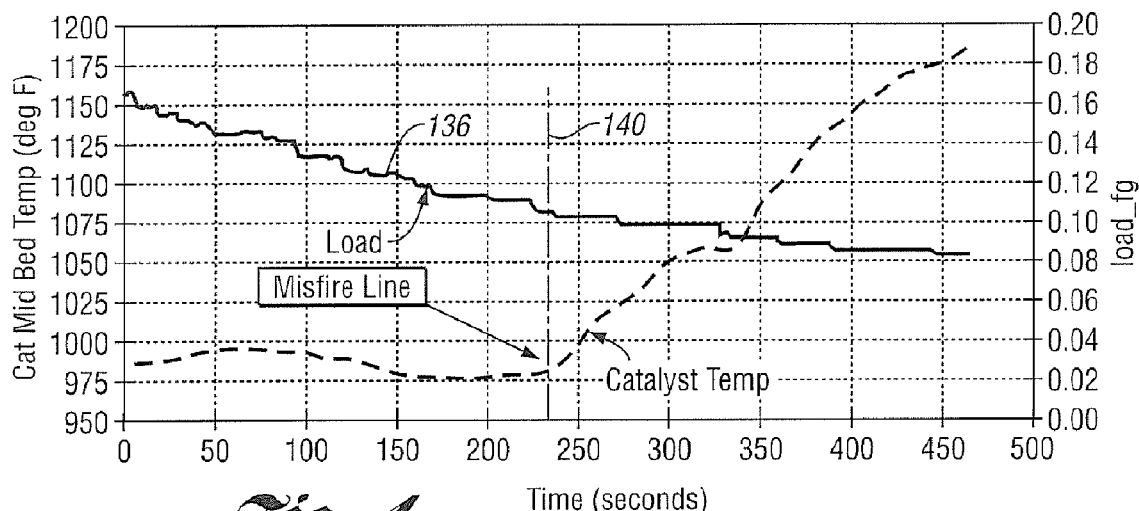
FIG. 4 is a calibration plot of a low load misfire line for a test engine at an engine speed of 900 rpm and a 10° advance in the engine spark before top dead center together with a time plot of engine exhaust gas catalyst temperature for various load levels.
Figure 5:
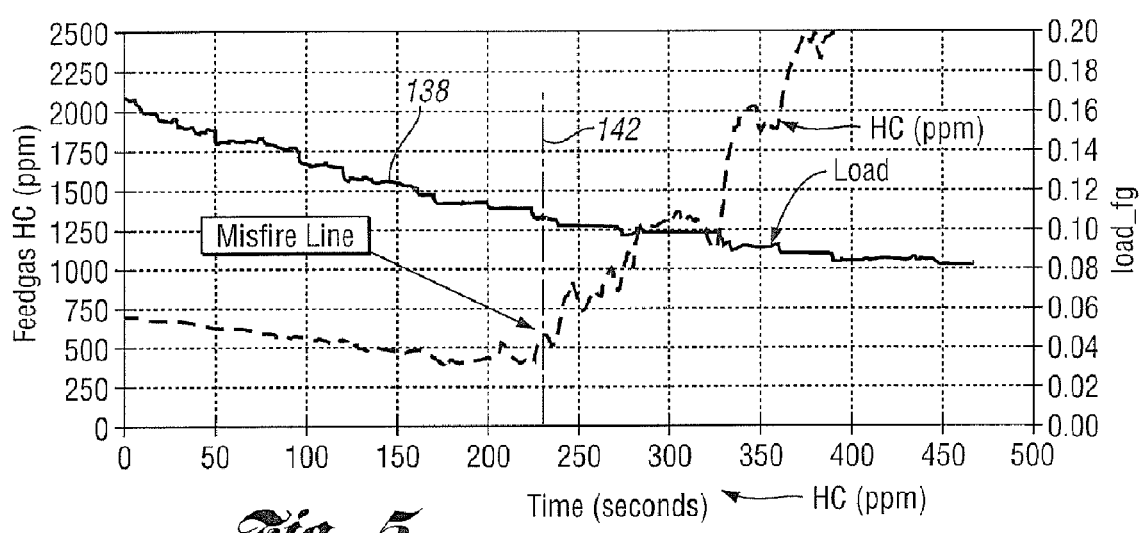
FIG. 5 is a time plot showing the effect on exhaust gas hydrocarbons as engine load is decreased beyond a misfire line.
Figure 6:
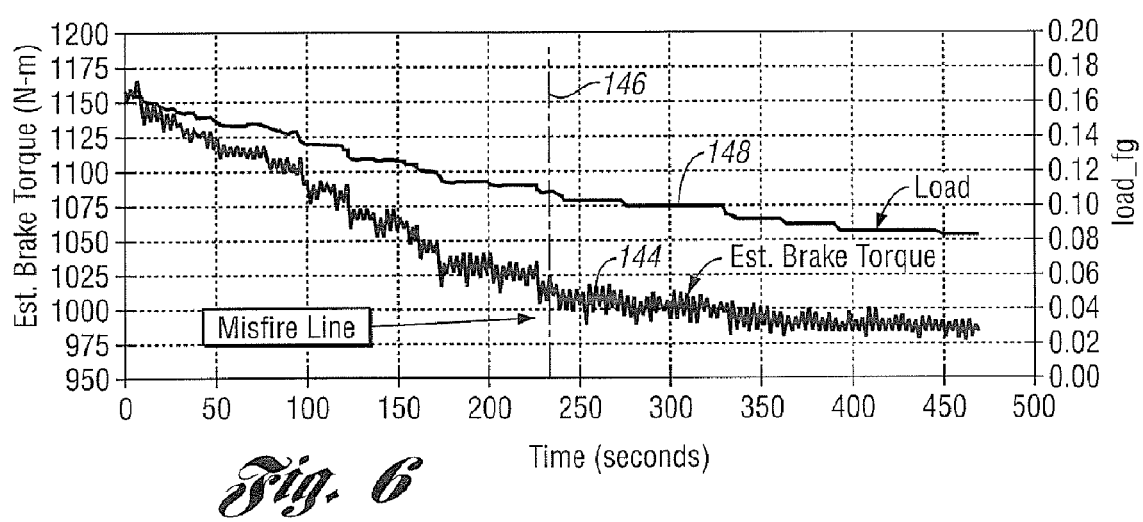
FIG. 6 is a time plot showing the effect of estimated brake torque as load is decreased beyond a misfire line.

FIGS. 4, 5 and 6 show a misfire line for a representative test engine, which is calibrated at 900 rpm and 10° before top dead center spark advance for a representative internal combustion test engine in a hybrid electric vehicle powertrain. The catalyst temperature and hydrocarbon emissions begin to rise as load is reduced, as indicated in FIGS. 4 and 5. The load line is shown at 136 in FIG. 4 and at 138 in FIG. 5. The calibrated misfire line is shown at 140 in FIG. 4 and at 142 in FIG. 5. The brake torque, which is plotted in FIG. 6, becomes increasingly negative, as shown at 144, after the misfire line 146 is exceeded as the load continues to decrease, as shown at 148 in FIG. 6. This problem is not as apparent at high engine speeds at or near the rated engine speed since the engine does not spend much time at these speeds during a tip-out.

Very low engine output torques are possible in hybrid electric vehicle powertrains. Indeed, they sometimes are required under certain operating conditions, such as tip-out transient events. Under these conditions, any excess engine torque will translate into a charging current in the battery, which can lead to battery power and state-of-charge (SOC) violations. Both of these conditions tend to be detrimental to battery performance and battery life. As a result, it is desirable to set the misfire torque limit as low as possible (a high negative value).

Since it is possible for the controller in a hybrid electric vehicle powertrain to request a very low brake torque output from the engine, the misfire limit should be properly determined and calibrated to prevent the engine from operating at or below the misfire point.

To maintain stable combustion at very low engine loads, a minimum air flow in the engine air intake manifold is needed. Combustion with air flow lower than this minimum could result in engine misfire leading to increased exhaust gas emissions and undesirable high catalytic converter temperatures. In a torque-based strategy where air flow is calculated based on requested engine torque, the minimum air flow at which a misfire might occur can be approximately translated to a minimum indicated engine torque at a given engine speed and assumed spark advance.

Minimum engine brake torque can be calculated from the minimum indicated torque, taking into account friction losses at a given engine speed. This torque value, called the misfire torque limit, as shown in FIGS. 4, 5 and 6, is the lower bound of engine torque production.

The torque control strategy calculates the minimum brake torque at a given engine speed in accordance with the following relationship:

$$tqe\_minairmf = fntq\_minair(n) - tqe\_los + tqe\_air\_adpt + tqe\_mnair\_add$$

where:

tqe_minairmf=minimum engine brake torque (misfire limit)

fntq_minair (n)=minimum engine indicated torque at the given engine speed.

tqe_los=total frictional torque losses tqe_air_adpt=adaptive torque difference used to compensate, for example, for throttle body aging or part-to-part (vehicle to vehicle) variation on new throttle bodies. It is the difference between "measured" torque and requested torque in open loop condition. This value could be positive or negative.

tqe_mnair_add=additive torque value for mass air flow (MAF) based load protection. This torque value will be added if the load value falls below a calibrated load value for a given engine speed.

Although embodiments of the invention have been described, it will be apparent to persons skilled in the art that modifications may be made without departing from the scope of the invention. All such modifications and equivalents thereof are intended to be covered by the following claims.

What is claimed is:

1. A method for controlling an engine in a powertrain for a hybrid electric vehicle, the vehicle having an internal combustion engine, at least one electric motor-generator, a battery, the battery and the motor-generator being electrically coupled, gearing establishing power flow paths from the engine and the motor-generator to a driven member connected drivably to vehicle traction wheels, and a controller for coordinating power distribution from the engine and the motor-generator in accordance with operating variables including a driver demand for power and battery state of charge, the method comprising the steps of:

calibrating a minimum load for the engine below which the engine fuel combustion tends to be unstable at a given engine speed;

determining an engine torque command by the vehicle system controller;

measuring engine load corresponding to the engine torque command;

calculating a minimum torque adder;

comparing the engine torque command at a given engine speed with a minimum engine torque that corresponds to the calibrated minimum engine load; and adding the minimum torque adder to the minimum engine torque when the measured engine load is near the calibrated minimum load whereby engine fuel combustion stability is maintained.

2. The method set forth in claim 1 wherein the minimum engine torque is computed at a given engine speed as function of operating variables including a calibrated engine speed and torque relationship, frictional torque losses, and the minimum torque adder.

3. The method set forth in claim 1 wherein the minimum torque adder is increased with respect to time when the measured engine load is less than the calibrated minimum load, increases in the minimum torque adder being ended when the measured engine load is greater than the calibrated minimum load by a calibrated amount.

4. The method set forth in claim 2 wherein the minimum torque adder is decreased when the measured engine load exceeds a calibrated upper limit whereby the measured load is maintained within a calibrated load limit band.

5. The method set forth in claim 3 wherein the minimum torque adder is decreased when the measured engine load exceeds a calibrated upper limit whereby the measured load is maintained within a calibrated load limit band.

6. The method set forth in claim 3 wherein the minimum torque adder is increased using a ramp and hold computation technique when the measured engine load is less than the calibrated minimum load until the measured engine load exceeds the calibrated minimum load.

7. The method set forth in claim 3 wherein the minimum torque adder is increased using a proportional-integral computation technique when the measured engine load is less than the calibrated minimum load until the measured engine load exceeds the calibrated minimum load.

8. The method set forth in claim 4 including the step of calculating a maximum value of the minimum torque adder whereby undesired battery charging is avoided.

9. The method set forth in claim 4 wherein the minimum torque adder is decreased with respect to time using a ramp and hold computation technique when the measured engine load is greater than the calibrated minimum load limit band.

10. The method set forth in claim 4 wherein the minimum torque adder is decreased with respect to time using a proportional-integral computation technique when the measured engine load is greater than the calibrated minimum load limit band.

11. A method for controlling an engine in a powertrain for a hybrid electric vehicle, the vehicle having an internal combustion engine, at least one electric motor-generator, a battery, the battery and the motor-generator being electrically coupled, gearing establishing power flow paths from the engine and the motor-generator to a driven member connected drivably to vehicle traction wheels, a catalytic converter in an exhaust gas transfer system for the engine, and a vehicle system controller for coordinating power distribution from the engine and the motor-generator in accordance with operating variables including a driver demand for power and battery state of charge, the method comprising the steps of:

calibrating a minimum load for the engine below which the engine fuel combustion tends to be unstable at a given engine speed;

determining an engine torque command by the vehicle system controller;

measuring engine load corresponding to the torque command;

calculating a minimum torque adder;

comparing the engine torque command at a given engine speed with a minimum torque value that corresponds to the calibrated minimum engine load;

adding the minimum torque adder to the minimum engine torque to obtain an increased engine torque command when the measured engine load is near the calibrated minimum engine load whereby engine fuel combustion stability is maintained;

limiting the minimum torque adder to effect a calibrated maximum torque limit; and limiting the duration of operation of the powertrain when the measured engine load is near the calibrated minimum load whereby excessive thermal damage to the catalytic converter is prevented.

12. The method set forth in claim 11 wherein the minimum engine torque is computed at a given engine speed as a function of operating variables including a calibrated engine speed and torque relationship, frictional torque losses, and the minimum torque adder.

13. The method set forth in claim 11 wherein the minimum torque adder is increased with respect to time when the measured engine load is less than the calibrated minimum load, increases in the minimum torque adder being ended when the measured engine load is greater than the calibrated minimum load.

14. The method set forth in claim 13 wherein the minimum torque adder is decreased with respect to time when the measured engine load exceeds a calibrated high limit whereby the measured engine load is maintained within a calibrated load limit band.

15. The method set forth in claim 14 including the step of calculating a maximum value of the minimum torque adder value whereby undesired battery charging is avoided.

16. A method for controlling an engine in a powertrain for a vehicle, the vehicle having an internal combustion engine, gearing establishing power delivery from the engine to a driven member connected drivably to vehicle traction wheels, and a controller for coordinating power distribution to the traction wheels in accordance with operating variables including a driver demand for power, the method comprising the steps of:

calibrating a minimum load for the engine below which the engine fuel combustion tends to be unstable at a given engine speed;

determining an engine torque command by the vehicle system controller;

measuring engine load corresponding to the torque command;

calculating a minimum torque adder;

comparing the engine torque command at a given engine speed with a minimum engine torque that corresponds to the calibrated minimum engine load; and adding the minimum torque adder to the minimum engine torque when the measured engine load is near the calibrated minimum engine load whereby engine fuel combustion stability is maintained.

17. The method set forth in claim 16 wherein the minimum engine torque is computed at a given engine speed as a function of variables including a calibrated engine speed and torque relationship, frictional torque losses, and the minimum engine torque adder.

18. The method set forth in claim 16 wherein the minimum torque adder is increased with respect to time when the measured engine load is less than the calibrated minimum load value, increases in the minimum torque adder being ended when the measured engine load is greater than the calibrated minimum load by a calibrated amount.

19. The method set forth in claim 18 wherein the minimum torque adder is decreased with respect to time when the measured load value exceeds a calibrated upper limit whereby the measured load value is maintained within a calibrated load limit band.

20. A method for controlling an engine in a powertrain for a vehicle, the vehicle having an internal combustion engine, gearing establishing at least one power flow path from the engine to a driven member connected drivably to vehicle traction wheels, a catalytic converter in an exhaust gas transfer system for the engine, and a controller for controlling power distribution to the traction wheels in accordance with operating variables including a driver demand for power, the method comprising the steps of:

calibrating a minimum load for the engine below which the engine fuel combustion tends to be unstable at a given engine speed;

determining an engine torque command by the vehicle system controller;

measuring engine load corresponding to the torque command;

calculating a minimum torque adder;

comparing the engine torque command with a minimum engine torque that corresponds to the calibrated minimum engine load;

adding the minimum torque adder to the minimum engine torque to obtain an increased engine torque command when the measured engine load is near the calibrated minimum engine load whereby engine fuel combustion stability is maintained;

limiting the torque adder to effect a maximum torque limit; and limiting the duration of operation of the powertrain when the measured engine load is near the calibrated minimum load whereby excessive thermal damage to the catalytic converter is prevented.

21. The method set forth in claim 20 wherein the minimum engine torque is computed at a given engine speed as a function of a calibrated engine speed and torque relationship, frictional torque losses, and the minimum torque adder.

22. The method set forth in claim 20 wherein the minimum torque adder is increased with respect to time when the measured engine load is less than the calibrated minimum load, increases in the minimum torque adder being ended when the measured engine load is greater than the calibrated minimum engine load.

23. The method set forth in claim 22 wherein the minimum torque adder is increased with respect to time using a ramp and hold computation technique when the measured load is less than the calibrated minimum engine load until the measured engine load exceeds the calibrated minimum engine load.

24. The method set forth in claim 22 wherein the minimum torque adder is increased with respect to time using a proportional-integral computation technique when the measured engine load is less than the calibrated minimum engine load until the measured engine load exceeds the calibrated minimum engine load.

25. The method set forth in claim 22 wherein the minimum torque adder is decreased with respect to time using a ramp and hold computation technique when the measured load is greater than a calibrated minimum load limit band.

26. The method set forth in claim 22 wherein the minimum torque adder is decreased with respect to time using a proportional-integral computation technique when the measured load is greater than a calibrated minimum load limit band.

* * * * *